Aug. 30, 1960 W. O. OBERG 2,950,815
EXTRUSION CONVEYING APPARATUS
Filed Nov. 22, 1957 2 Sheets-Sheet 2

INVENTOR
WILLIAM O. OBERG
by his attorneys
Glenn and Jackson

2,950,815

EXTRUSION CONVEYING APPARATUS

William O. Oberg, Southampton, Va., assignor to Reynolds Metals Company, Richmond, Va., a corporation of Delaware Filed Nov. 22, 1957, Ser. No. 698,144

3 Claims. (Cl. 207—1)

This invention relates to conveying apparatus, and more particularly to an apparatus for transferring hot metal extrusions from a run-out table associated with a metal extrusion press.

In the extrusion of metal forms, such as aluminum extrusions, it is conventional to extrude the metal in lengths of up to about fifty feet onto a run-out table. After the predetermined length has been extruded, the extrusion press is stopped momentarily and the extruded length of metal is severed near the press. The severed piece of metal is then quickly moved off the run-out table so that the extrusion press can resume operation as soon as possible. This procedure is repeated until the billet or charge in the press has been consumed.

In the prior art, the severed extrusion has usually been removed manually from the run-out table by workmen who grasp opposite ends of the extruded member with suitable tools and manually move it from the run-out table onto stationary supports adjacent the table. The manual procedure just described for laterally shifting the extruded metal member off the run-out table has several disadvantages, the most important of which is the likelihood of marring or bending the extrusion during the manual shifting process since the extrusion is still hot and easily damaged. Furthermore, the length of the extruded piece which can be handled by the manual method heretofore used is limited due to the human factor involved with the result that the extrusion press must be stopped and started more frequently using manual methods than if the shifting of the extrusion were accomplished by a power-driven mechanized process.

In accordance with the present invention, these difficulties are overcome by providing the extrusion press with a novel combination run-out table and transfer and cooling bed apparatus which facilitates removing metal extrusions, particularly soft aluminum extrusions, from the run-out table in such manner that successive extrusion operations can be carried out with a minimum of delay, and the extruded members can be removed and cooled with substantially no marring of their extruded surfaces, with a minimum of plant space required for the run-out table and transfer and cooling apparatus, and in an efficient manner which is well-adapted to complete automation.

For a better understanding of the invention, reference is now made to the present preferred embodiment of the invention which is shown, for purposes of illustration only, in the accompanying drawings. In the drawings.

Figure 1:
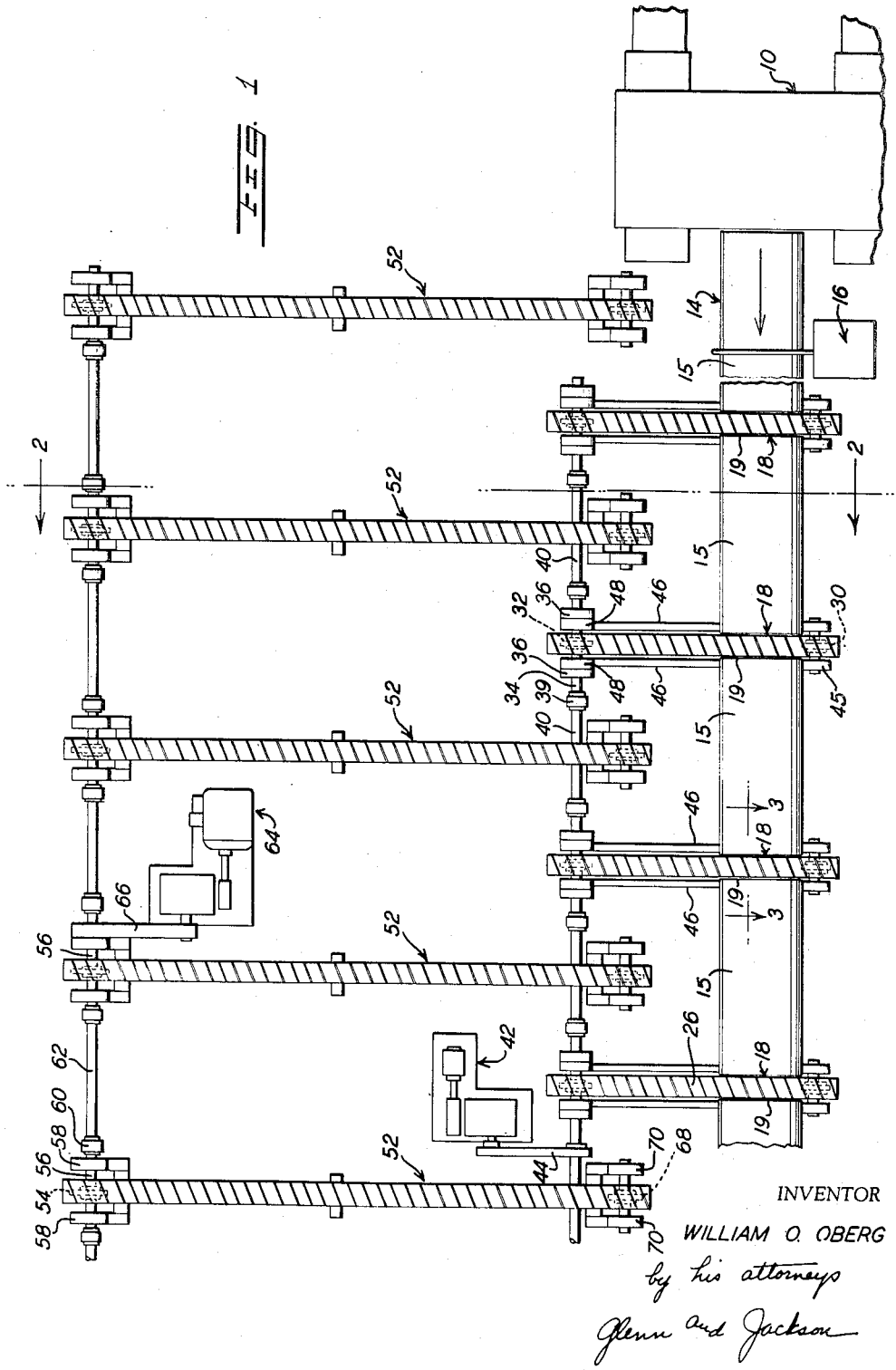
Fig. 1 is a top plan view of an extrusion press and transfer apparatus in accordance with the invention.
Figure 2:
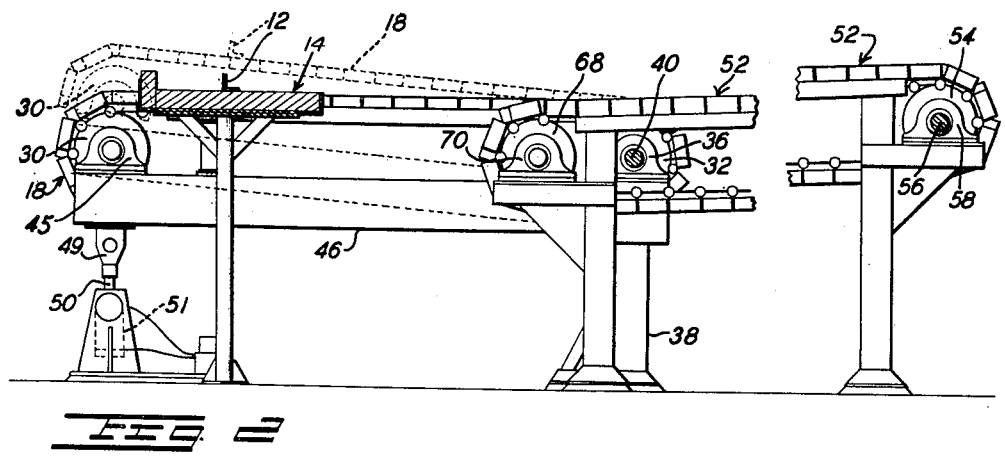
Fig. 2 is a view in transverse section along line 2—2 of Fig. 1.

Referring now to the drawings, and more particularly to Figs. 1 and 2, there is shown an extrusion press generally indicated at 10 which extrudes metal forms such as the angle-beam 12 onto a run-out table generally indicated at 14. A suitable cutting device generally indicated at 16 is positioned adjacent the outlet of extrusion press 10 and is energized when required to sever the extrusion 12 into units of desired length. The extruded member 12 may, for example, be severed into 100-foot lengths with the apparatus of the present invention.

In order to laterally transfer the hot extruded member 12 from run-out table 14, a plurality of laterally movable conveyor members each generally indicated at 18 is provided. In order to accommodate the laterally movable conveyors 18, run-out table 14 includes table portions 15 separated by longitudinally-spaced laterally-extending slots or discontinuous portions 19 through which each respective conveyor 18 passes. As will be explained more fully hereinafter, the upper run of each respective conveyor 18 lies in a plane flush or substantially flush with the surface of run-out table 14 while the extrusion process is taking place, with each conveyor 18 being moved vertically upwardly about a pivotal support at one of its ends when the lateral transfer of the extruded form takes place.

Figure 3:
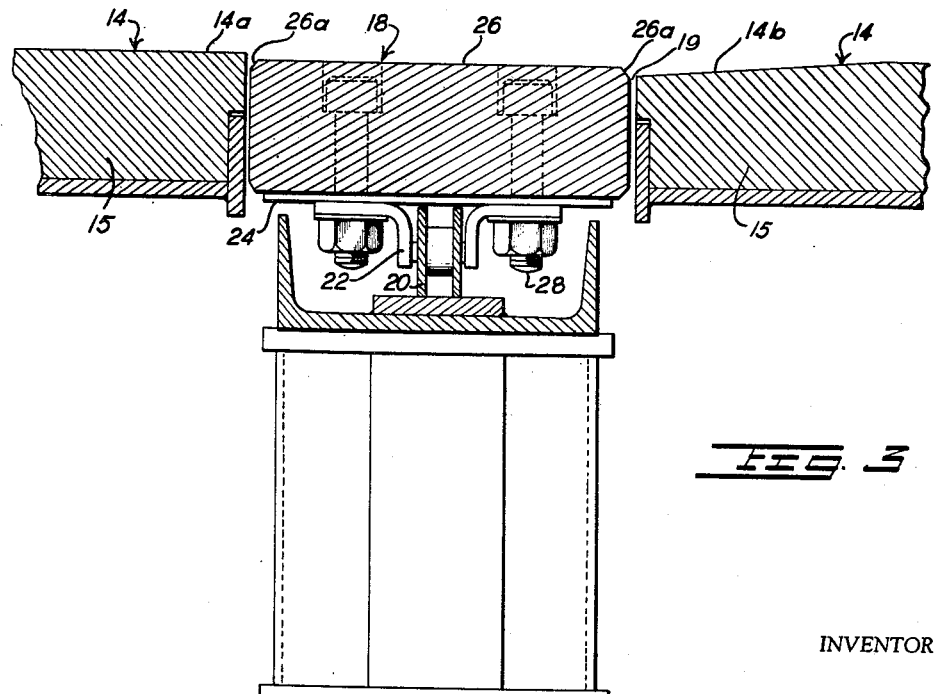
Fig. 3 is a view in section along line 3—3 of Fig. 1 showing details of the construction of the lateral conveyors of the first group.

As will best be seen in Fig. 3, each conveyor 18 includes a chain member 20, including links which have fastened thereto laterally extending bracket members 22 which support a plate member 24 to which is secured a carbon block 26. Each carbon block 26 is fastened to a corresponding plate 24 by bolt members 28 the heads of which are received in countersunk openings in the outer face of the block 26. As illustrated in Fig. 1, each of the blocks 26 has the shape of an oblique parallelepiped with its upper surface in the form of an oblique parallelogram having two of its opposite sides extending parallel to the line of movement of the conveyor 18, and having its other two sides extending obliquely relative to the line of movement of the conveyor 18 and also relative to the line of movement of extrusion members 12 from the press 10 along the length of the table 14. The oblique said other two sides have the advantage of preventing any thin flange of an extruded member from becoming caught in the joint between adjacent blocks 26. This is accomplished because the said other oblique sides of the conveyor blocks, which are the front and rear surfaces of blocks 26 in the direction of movement of conveyor 18, extend to positions, along the conveyor's path of movement, alongside of and lapping the positions occupied by the front and rear surfaces of adjacent conveyor blocks.

It is important that the leading ends of extrusions moving across the table 14 should not catch against the sides of the blocks 26 nearest the press 10, and that the said leading ends should likewise not catch against the edge of the stationary section of the table 14 on the other side of each block 26 as the said leading ends pass from the blocks 26 back to the table 14. The sides of the blocks 26 are beveled as shown at 26a in Fig. 3, and the portion 15 of the table 14 on the side of each block 26 nearest the press 10 is raised slightly above the level of the adjacent block 26, as shown at 14a in Fig. 3, while the stationary portion 15 of the table 14 on the other side of each block 26 is tapered, as shown at 14b in Fig. 3, in order to prevent the leading ends of the extruded members 12 from catching against any edges of table 14 and blocks 26. The top surfaces of the blocks 26 are adapted to slidably support the intermediate portions of the extruded members 12, and this support is often necessary in the case of small-sectioned aluminum extrusions. As a result of these arrangements, the blocks 26 of the conveyor 18 in its retracted position cooperate with the stationary portions 15 of the run-out table 14 to provide a substantially continuous supporting surface along which the extruded members can slide over the carbon surfaces with relatively little friction and substantially no marring, even in the case of aluminum extrusions emerging from the press 10 at high temperatures on the order of 900° F.

The chain 20 of each conveyor 18 passes around oppositely disposed sprocket members 30 and 32, respectively, sprocket 30 being positioned closely adjacent the edge of run-out table 14 while sprocket 32 is positioned relatively farther from said table 14 in laterally spaced relation to the path of the extruded product as it moves over said run-out table 14. Each sprocket 32 is mounted on a sprocket shaft 34 supported by bearing members 36 rigidly mounted on a suitable bearing pedestal 38 (Fig. 2). The sprocket shaft 34 of each sprocket 32 is connected by a suitable coupling means 39 to a connecting or intermediate shaft 40 which connects each respective sprocket shaft 34 to the corresponding sprocket shafts on either side of it. The plurality of sprockets 32 together with their sprocket shafts 34 and the connecting shafts 40 are driven as a unit by a drive motor generally indicated at 42 having a drive chain 44 connected to the drive system which includes sprockets 32, sprocket shafts 34, and connecting shafts 40. Thus all of the sprockets 32 are driven at the same speed as a unit.

The conveyors 18 are mounted for pivotal movement about the axis of sprocket shafts 34 in a manner which will now be described to permit conveyors 18 to move pivotally upwardly to lift the extruded member which is being laterally transferred above the level of the upper surface of run-out table 14 and thereby avoid scraping the extruded member along run-out table 14 as it is being laterally moved. The sprockets 30 are each supported for rotation by a pair of bearing members 45 which in turn are supported upon frame members 46 (Fig. 2) which lie beneath the level of run-out table 14. Frame members 46 are connected at their opposite ends to bearing members 48 which are pivotally movable about the axis of sprocket shaft 34.

Frame members 46 which support the respective conveyors 18 have connected to the end thereof below bearing 45 which supports sprocket 30 a bracket member 49 which, in turn, is pivotally connected to a piston rod member 50 operating in an air cylinder 51. When it is desired to raise conveyor 18 to the dotted-line position shown in Fig. 2, compressed air is admitted to cylinder 51 in such manner as to move the piston rod 50 upwardly, thereby raising frame members 46 and the conveyor 18 supported thereby upwardly about the pivotal axis of sprocket shaft 34. Thus, upon pivoting of the frame members 46, the distance between the axes of sprockets 30 and 32 remains constant, with neither slackening nor stretching of the conveyor chain 20.

A plurality of longer slower moving conveyors each generally indicated at 52 cooperate with the conveyors 18 previously described. Each of the conveyors 52 includes a drive sprocket 54 mounted on a sprocket shaft 56 supported by a pair of oppositely disposed bearings 58. Each of the sprocket shafts 56 is connected through a coupling member 60 to a connecting shaft 62 which connects adjacent sprocket shafts 56 to each other. A plurality of connected sprocket shafts 56 are driven simultaneously and at the same speed by an electric motor generally indicated at 64 which is connected to the plurality of sprocket shafts 56 through a drive chain 66. The sprocket shafts 56 are driven at a rate such that conveyors 52 move at a substantially slower rate than conveyors 18. The opposite end of each of the respective conveyors 52 passes around a sprocket 68 supported by a pair of bearings 70. The bearings 70 of each conveyor 52 are so located that each conveyor 52 overlaps the adjacent conveyor 18.

In the operation of the apparatus hereinbefore described, conveyors 18 remain stationary, and conveyors 52 preferably but not necessarily continue to run while extrusion press 10 is operating to extrude a metal member onto run-out table 14. While extrusion press 10 is in the process of extruding a metal form, conveyors 18 lie in a plane such that the upper run of the respective conveyors 18 is substantially in the same plane as, or very slightly below, the upper surface of run-out table 14. When an extruded member of a predetermined length has been extruded onto the run-out table, cutting device 16 is actuated to cut the extrusion into the desired length. The plurality of air cylinders 51 which control the upward movement of the respective conveyors 18 are then simultaneously actuated to cause the piston rods 50 of each of the respective cylinders to move upwardly to raise frame members 46 on which each respective conveyor 18 is mounted upwardly about its pivotal connection on the axis of sprocket shaft 34. The motor 42 which drives conveyors 18 is then started and conveyors 18 move the extruded member laterally off run-out table 14 and deliver the extrusion onto the plurality of conveyors 52. Conveyors 52, which preferably run continuously, move at a substantially slower rate than conveyors 18 and carry the extruded member further away from run-out table 14. The rate of movement of conveyors 52 is such as to allow the extruded member to cool by the time it has reached the end of the run of the conveyors 52. The cooled extruded members are then lifted off conveyors 52 by any suitable means or delivered by conveyors 52 to a suitable discharge receptacle or receiving means.

It can be seen from the foregoing that there is provided in accordance with this invention a conveying apparatus including a mechanized extrusion transfer device which has great practical advantages over the manual methods of transferring metal extruded members from a run-out table in accordance with the prior art. The vertically movable conveyor apparatus hereinbefore described cooperates with the run-out table to transfer the extrusions without marring or otherwise damaging them, as frequently happens using manual methods of the prior art. Furthermore, the mechanized extrusion transfer apparatus permits a much longer extrusion to be handled and transferred than when the manual methods of the prior art are used. The use of the fast moving conveyors 18 permits the extruded members to be moved quickly off the run-out table, thereby permitting the extrusion press to resume operation quickly, while the slower moving conveyors 52 move the extruded members at a rate which allows sufficient time for complete cooling of the extrusions before they leave the transfer system.

While a present preferred embodiment of the apparatus and operation of the invention has been described and illustrated, it will be recognized that the invention may be variously otherwise practiced and embodied within the scope of the following claims.

I claim:

1. In an endless conveyor comprising an upper run, a lower run, and curved end portions connecting the upper run to the lower run, said curved end portions being rotatable about axes, said conveyor having an outer load-engaging and load-supporting surface extending substantially parallel to said axes of rotation, the conveyor including a plurality of conveyor blocks movable in an endless path of movement and mounted in successive positions along said endless path; drive means engageable with said conveyor for driving the same in said endless path; said conveyor load-engaging surface being formed by outer load-engaging surfaces of said conveyor blocks extending substantially-parallel to said axes; the improvement which comprises said conveyor blocks having the shape of oblique parallelepipeds, the outer load-engaging surfaces of said blocks having the shape of oblique parallelograms extending substantially parallel to said axes of rotation; each said block having a front surface foremost in the direction of said path of movement and a rear surface rearmost in the direction of said path of movement; said front and rear block surfaces extending obliquely to said path of movement; said front and rear block surfaces being substantially-perpendicular to said outer load-engaging surface of the block; said front and rear block surfaces extending to positions, along said path of movement, alongside of and lapping the positions occupied by the front and rear surfaces of adjacent conveyor blocks; whereby an article carried by said conveyor and extending generally parallel to said axes of rotation can be supported by at least one of said conveyor blocks and can be prevented from entering space between adjacent conveyor blocks.

2. The invention as set forth in claim 1 wherein said front and rear block surfaces are rectangular and the block surfaces extending parallel to said path of movement and perpendicular to said axes of rotation are rectangular; and wherein said parallelograms are rhomboids.

3. Apparatus for handling extrusions that are ejected from an extrusion press for die expressing said extrusions, said apparatus comprising a run-out table for receiving pieces ejected from said extrusion press and an endless conveyor for moving pieces from said run-out table transversely of the path of movement of extrusions ejected from said extrusion press, said run-out table including at least two portions separated by a gap extending transversely of said path of movement of the extrusions ejected from said extrusion press, each of said two table portions having a substantially-integral upper surface, one of said table portions being nearer to said extrusion press and the other said table portion being farther from said extrusion press, said endless conveyor having an outer load-engaging surface substantially filling said gap between said two table portions, the outer load-engaging surface of said endless conveyor being slightly below the upper surface of said nearer table portion, the upper surface of the end part of said farther table portion adjacent said endless conveyor being slightly below said outer load-engaging surface of said conveyor; the main part of said farther table portion, exclusive of said end part, having its upper surface at substantially the same level as the upper surface of said nearer table portion; said endless conveyor comprising an upper run, a lower run, and curved end portions connecting the upper run to the lower run, said curved end portions being rotatable about axes, said endless conveyor including a plurality of conveyor blocks movable in an endless path of movement and mounted in successive positions along said endless path, drive means engageable with said endless conveyor for driving the same in said endless path; said conveyor blocks having the shape of oblique parallelepipeds, the outer load-engaging surfaces of said blocks having the shape of oblique parallelograms extending substantially-parallel to said axes of rotation; each said block having a front surface foremost in the direction of said endless path of movement and a rear surface rearmost in the direction of said endless path of movement; said front and rear block surfaces extending obliquely to said endless path of movement; said front and rear block surfaces being substantially-perpendicular to said outer load-engaging surface of the block; said front and rear block surfaces extending to positions, along said endless path of movement, alongside of and lapping the positions occupied by the front and rear surfaces of adjacent conveyor blocks; and, means for raising the portion of said endless conveyor located in said gap between said two table portions to a level where the outer load-engaging surface of said endless conveyor is above the upper level of said table portions; whereby extrusions ejected from said extrusion press can move smoothly over the upper surface of said run-out table without encountering obstructions and can, upon being severed or otherwise divorced from the constraint of the extrusion die and other press parts, be carried by said endless conveyor while preventing said extrusion from entering space between adjacent conveyor blocks.

References Cited in the file of this patent

UNITED STATES PATENTS

| Number | Name | Date |
|---|---|---|
| 567,410 | Potter | Sept. 8, 1896 |
| 922,854 | Cleveland | May 25, 1909 |
| 942,644 | Huston | Dec. 7, 1909 |
| 1,199,818 | Peck | Oct. 3, 1916 |
| 1,393,580 | Schranz | Oct. 11, 1921 |
| 1,831,629 | Mambourg | Nov. 10, 1931 |
| 2,031,008 | Schwerak | Feb. 18, 1936 |
| 2,301,915 | Harrington | Nov. 17, 1942 |
| 2,527,024 | Mitchell | Oct. 24, 1950 |
| 2,627,883 | Littley | Feb. 10, 1953 |
| 2,734,979 | Higley | Feb. 14, 1956 |
| 2,738,062 | Edgecombe | Mar. 13, 1956 |

FOREIGN PATENTS

| Number | Country | Date |
|---|---|---|
| 53,001 | Sweden | Nov. 8, 1922 |